United States Patent [19]

Morimoto et al.

[11] 4,338,340

[45] Jul. 6, 1982

[54] EXTRUDED PROTEIN PRODUCT

[75] Inventors: Keisuke Morimoto, Congers; Brenton G. Edgar, White Plains; Thomas J. Hirasuna, Yonkers, all of N.Y.

[73] Assignee: General Foods Corporation, White Plains, N.Y.

[21] Appl. No.: 170,464

[22] Filed: Jul. 21, 1980

[51] Int. Cl.³ .................................................. A23J 3/00
[52] U.S. Cl. .................................... 426/104; 426/574; 426/656; 426/657; 426/516; 426/802
[58] Field of Search ............... 426/104, 574, 656, 657, 426/802, 516

[56] References Cited

U.S. PATENT DOCUMENTS

| | | | |
|---|---|---|---|
| 3,814,823 | 6/1974 | Yang et al. | 426/802 X |
| 3,886,298 | 5/1975 | Hayes et al. | 426/104 X |
| 3,886,299 | 5/1975 | Feldbrugge et al. | 426/656 |
| 3,900,573 | 8/1975 | Freck et al. | 426/802 X |
| 3,925,562 | 12/1975 | Tannenbaum | 426/802 X |
| 3,953,612 | 4/1976 | Coplan et al. | 426/104 |
| 4,018,903 | 4/1977 | Segeren et al. | 426/104 |
| 4,031,267 | 6/1977 | Berry et al. | 426/802 X |
| 4,125,630 | 11/1978 | Orthoefer | 426/802 X |
| 4,197,327 | 4/1980 | Kawasaki et al. | 426/656 X |

FOREIGN PATENT DOCUMENTS

| | | |
|---|---|---|
| 2441134 | 6/1975 | Fed. Rep. of Germany ...... 426/104 |
| 1105904 | 3/1968 | United Kingdom . |
| 1174906 | 12/1969 | United Kingdom . |
| 1539725 | 1/1979 | United Kingdom . |

OTHER PUBLICATIONS

Sutermeister, E., et al., "Casein and Its Industrial Applications", Reinhold Publ. Co., N.Y. 1939, pp. 18–19

*Primary Examiner*—Robert A. Yoncoskie
*Attorney, Agent, or Firm*—Joyce P. Hill; Daniel J. Donovan; Thomas R. Savoie

[57] ABSTRACT

A meat analog is prepared from an aqueous protein solution comprising heat-coagulable protein. The heat-coagulable protein in the solution is denatured before or after the intimate mixing with a starch and an alkali metal sulfite, the moisture level of the resulting mixture is adjusted to a level suitable for extrusion in equipment that shapes and forms a fibrous protein product having meat-like texture.

21 Claims, No Drawings

EXTRUDED PROTEIN PRODUCT

TECHNICAL FIELD

A highly-desirable goal in the food processing industry is to employ very nutritious but inexpensive food materials in processes that result in products having high consumer appeal. Particular efforts have been directed towards the production of simulated meat products from vegetable and/or animal protein substances. These simulated meat products are often referred to as meat analogs. A meat analog is a food product made to resemble a meatflesh material such as chicken, beef, pork or seafood.

One of the principal methods of forming meat analogs is by thermoplastic extrusion which is an adaptation of technology used in the plastics industry. Extrusion is also used to make ready-to-eat cereal food products. The thermoplastic extrusion process involves preparing a mixture of protein, water, flavor and other minor ingredients, and thereafter feeding this mixture into a cookerextruder wherein it is subjected to heat and pressure and subsequently extruded. As the extrudate enters the atmosphere, it expands. The extrudate texture has been characterized as "meat-like" fibers. The heating and shearing within the extruder in combination with the sudden shift from a superatmospheric pressure environment to atmospheric pressure at the extruder discharge all contribute to producing the appearance of fibers.

The following patents describe the use of thermoplastic extrusion techniques in forming fibrous meat analogs.

U.S. Pat. No. 3,814,823 (Yang et al) employs heat-coagulable animal or vegetable protein in the preparation of a coherent workable dough which is stretched and pulled non-turbulently in a cookerextruder to provide parallel unidirectional fibers.

U.S. Pat. No. 3,886,299 (Feldbrugge et al) uses heat-coagulable animal or vegetable protein which must contain a minimum percentage of undenatured protein to form a dough that is stretched, pulled and heat-set in an extruder to form a dense, meatlike fibrous structure that is recovered from the extruder in a manner that minimizes fiber puffing.

Typically, some very desirable protein materials, such as egg albumen, were avoided in the extrusion processes described above because high fouling and plugging problems would be encountered, particularly when using a single-screw extruder. Since the prior art does not mention operational problems encountered when extruding sticky, cohesive proteins, it is believed that only limited protein sources were used in auger-fed extrusion processes prior to this invention.

Additional problems are inherent in the preparation of meat analogs from limited protein sources. For example, when using a vegetable protein material such as soybean, it may be necessary to prepare a protein concentrate from the vegetable protein source materials prior to texturization of the vegetable protein. Also, the vegetable protein material may not have the desired amino acid balance or other nutritionally desirable qualities. In this case, it may be necessary to add other protein materials or amino acids in order to provide the desired nutritional balance. Flavor in vegetable protein materials has also created problems at times. For example, a soybean flavor may remain in the product. The present invention avoids such problems by preparing the analog from protein sources that have a flavor which can be masked or blended to give the desired flavor in an analog extrudate. The preferred embodiment of this invention provides a highly-nutritious, cohesive, fibrous material suitable for a shrimp analog.

DISCLOSURE OF THE INVENTION

Presented herein is a novel process for incorporating highly-nutritious, heat-coagulable protein in extruded fibers suitable for use in a meat analog. Broadly, the extruded protein fibers of this invention comprise a denatured protein which is intimately mixed with an alkali metal sulfite and starch prior to extrusion. The extrusion step includes mechanically working the denatured, protein-containing mass under sufficient conditions of heat, pressure and time so that aligned fibers are obtained. The alkali metal sulfite is added in controlled amounts to inhibit the development of off-flavors and colors. Starch is added for purposes of texture modification. A denaturing pretreatment of the heat-coagulable protein overcomes difficulties encountered in feeding sticky, cohesive, difficult-to-handle proteins, such as egg albumen, in a screw-type extruder.

The process involves forming a dry, water-soluble starting material containing 30–100% heat-coagulable protein; adding water and intimately mixing the dissolved protein molecules to form an aqueous, protein-containing solution; denaturing the heat-coagulable protein in the solution so that it is less sticky, non-cohesive and insoluble in water; drying and grinding the denatured, protein-containing mixture to form a free-flowing powder; and extruding the denatured, protein-containing mixture in an extruder designed to form natural, meat-like fibers.

As used herein, the term "dry protein mix" is meant to include all the dry ingredients exclusive of water. The dry mix may include 100% protein or a combination of protein with other edible substances. Amounts of each of these ingredients will be hereinafter specified as percent by weight of the dry mix only.

The dry, protein-containing mix can comprise from 30 to 100% by weight of a heat-coagulable protein, when less than 100% of the protein is heat-coagulable, the remaining protein fraction consists of nonheat-coagulable protein. If amounts of heat-coagulable protein less than 30% by weight are employed, insufficient protein is present to produce meat-like fibers in subsequent processing steps. All proteins used as starting materials in this invention must be sufficiently water-soluble so that effective mixing of protein molecules can occur in an aqueous medium.

For example, in the preferred embodiment of this invention, the dry protein mix comprises a heat-coagulable protein, such as egg albumen, and a nonheat-coagulable protein, such as sodium caseinate, in equivalent amounts. If desired, the protein mix can comprise up to 70% of a nonheat-coagulable protein. By adjusting the ratio of heat-coagulable protein to nonheat-coagulable protein, fiber texture modifications can be achieved. It is believed that the molecular level mixing of a heat-coagulable protein with a nonheat-coagulable protein results in a very beneficial change in the bonding of heat-coagulable protein molecules to each other during subsequent processing.

With regard to the source of the protein for this invention; of course, the protein must be edible if it is to be incorporated in meat analog products for human ingestion. Otherwise, the protein may be of animal, vegetable or monocellular origin, water-soluble and capable of blending with other edible materials. The heat-coagulable protein in this invention must also be capable of being made water insoluble by a denaturing treatment. Examples of suitable heat-coagulable protein sources are animal protein such as those derived from milk, eggs, poultry, meat and/or seafood; typically, egg albumin, blood-serum albumin, milk-whey protein and the like. Examples of suitable vegetable or monocellular sources of heat-coagulable protein are soybeans, safflower seed, corn, peanuts, wheat, peas, sunflower seed, cottonseed, coconut, rapeseed, sesame seed, leaf proteins, single-cell proteins such as yeast, and the like. Examples of suitable nonheat-coagulable proteins are caseinate, gelatin and the like.

While not critical to the process of this invention from the standpoint of producing meat-like fibers, but preferable from the standpoint of consumer acceptability and process efficiency, the dry protein mix can comprise, in addition to a major amount of protein, minor amounts of sulfite and starch.

Extrudate texture modifications result when the dry protein mix is supplemented, with from about 10% to about 30% by weight (dry basis) of a starch selected from the group consisting of corn, amioca, tapioca, wheat, sago, rice and the like.

Another minor ingredient in the dry protein mix, comprising less than 2.5% by weight on a dry basis, can be a metal sulfite such as sodium sulfite, potassium sulfite, sodium bisulfite, potassium bisulfite, and the like. Typically, from 0.1 to 2.5% sulfite based on the weight of the dry protein mix is suitable, 0.3 to 0.5% is preferred. The sulfite compound is useful in controlling the color and flavor of the finished extrudate. It is observed that the addition of suitable sulfite salts to sodium caseinate and egg albumen feed materials eliminates objectional flavors and prevents browning during extrusion.

For example, when using sodium caseinate and egg albumen in the dry protein mix, the pH value of the mixed ingredients is maintained between 6.0 and 8.0. At pH levels higher than 8.0, the extrudate has a soft, slimy texture; at pH levels below 6.0, this same extrudate composition has a dry, hard texture. The amount of alkali metal sulfite specified above does not significantly alter the desired pH value for this mixture.

In summary, the dry protein mix composition is generally as follows:

| Dry protein mix: | Percent by weight |
|---|---|
| Heat-coagulable protein | 30-100 |
| Non-heat coagulable protein | 0-70 |
| Starch | 0-30 |
| Sulfite | 0-2.5 |

After forming the dry protein mix, the moisture content of the protein mix is adjusted. The term "aqueous protein solution" is used to refer to the moisturized dry protein mixture and the amount of moisture employed is expressed as percent by weight of the total wet mix, inclusive of moisture. The aqueous protein solution formed has a moisture content within the range of from 40% to 90% by weight of the aqueous solution. The extent to which the moisture content in the aqueous protein solution exceeds 40% is not critical but would increase drying costs since moisture content is reduced to a 20–40% range in subsequent processing. An aqueous protein solution having a moisture content of less than 40% by weight is undesirable because the material is so viscous as to be extremely difficult to handle in a denaturing process. Moreover, where the moisture content is less than 40%, mixing of ingredients on the molecular level is not achieved. Thus, the product becomes grainy and has an objectional texture. From the standpoint of process efficiency and optimum fiber formation, moisture content of the aqueous protein solution prior to denaturing is preferably within the range of from 50% to 70% by weight.

After forming the aqueous protein solution and intimately mixing the components therein, the heat-coagulable protein in the aqueous solution is denatured so as to render it less sticky, noncohesive and water insoluble. Denaturing may be effected by any suitable means. For example, the aqueous protein solution can be contacted with a non-aqueous, water-miscible solvent, such as methanol, ethanol or propanol at room temperature (23° C.). The amount of solvent used is sufficient to form an aqueous protein solution/solvent mixture containing 30%–70% solvent based on the total weight of water present. Alternatively, denaturing may be effected by heating the aqueous protein solution above the heat coagulation temperature of the protein for a short period of time, e.g., a few seconds up to 30 minutes, depending on the heating technique used. The objective of this treatment is to use mild conditions to convert the heat-coagulable protein to a water-insoluble state. When water solubility of the protein is decreased to a level beyond which further measurable changes cannot be effected, the denaturing treatment is stopped. Further treatment is not deemed beneficial, nor economical from the standpoint of time and energy consumption as well as a decline in nutritional value of the protein.

While the exact heat coagulation temperature varies depending upon the protein source employed, it has been found that generally the heat coagulation temperature of most proteins suitable for use in the process of this invention is at a temperature of less than about 100° C. and generally at a temperature of greater than 60° C. For example, when denaturing an aqueous protein solution containing 15.7% heat-coagulable protein, 15.7% nonheat-coagulable protein, 63.0% water, 5.5% cornstarch and 0.1% sodium sulfite by weight, the solution is heated to temperatures between 80° C. and about 100° C. for from about 1 minute to about 30 minutes.

After denaturation is completed, the resulting aqueous mixture is reduced to a suitable moisture content. Air drying at room temperature is one way to reduce moisture content. The denaturation and drying steps can also be done simultaneously with suitable equipment, e.g., a drum dryer. If desired, the aqueous mixture containing denatured protein is dried and subdivided into particles, typically about 1 mm in diameter. If a starch and an alkali metal sulfite are ingredients in the aqueous protein solution prior to denaturization, it is only necessary to adjust the moisture level of the protein/starch/sulfite mixture to about 20 to about 40% based on the total weight of the mixture prior to extrusion. If the aqueous protein solution consisted only of protein, a starch and an alkali metal sulfite are added after denaturization. The denatured protein/starch/sulfite mixture then undergoes a moisture adjustment such that the moisture level is between about 20% and about 40% based on the total weight of the mixture.

The resulting moisture-adjusted, denatured protein-/starch/sulfite, mixture usually has the appearance of a moist, free-flowing powder. This material is easily fed through an extrusion device maintained at maximum temperatures of at least about 140° C. to provide an extrudate having a fibrous, meat-like texture.

The extrusion devices which are suitable for the process of this invention are typical of those used in the plastics industry. They must be capable of providing an externally-heated channel of a gradually diminishing cross-section area, usually accomplished by a compression screw. At the end of the channel is a die which permits a large pressure reduction and thus an expanded product. The die cross section may be in the shape of a square, a parallelogram, a hexagon, or any other convenient shape. However, the most common shape is a circular cross section. When using such a device, the material, i.e., the moist-flowing powder, is gradually moved forward in plug flow while simultaneously being heated by the walls of the chamber and compressed by the decreasing channel depth in order to form cohesive, aligned fibrous material.

It was surprising and unexpected to find that water-soluble, heat-coagulable proteins which have been subsequently denatured to the extent that they are water-insoluble and coagulated could be formed into cohesive protein fibers by extrusion. Appropriate adjustments in composition of the pre-extrusion mixture can produce extrudates of excellent flavor, texture and color. The pretreatment process which denatures the heat-coagulable protein to the extent where it is noncohesive, less sticky and water insoluble also makes it possible to extrude previously difficult-to-feed, high-fouling ingredients without plugging and fouling the extruder equipment. Thus, it is now possible to extrude proteins from a broader range of sources and obtain very nutritious, cohesive, meat-like fibers for use in foodstuffs. The extruded fibers do not revert to a nonfibrous structure upon hydration.

The extruded fibers have a bland flavor, a meat-like appearance and sensory-textural properties of natural meat flesh. To prepare an edible protein product resembling a natural meat, the fibers are soaked in water, shredded into finer fiber shapes, mixed with flavorings, color, etc. The resulting mixture containing shredded fibers is shaped or molded and thereafter set. Setting may be effected by heat setting the fibers per se or by adding a binder material to the mixture and then setting the binder. Heat-settable binders, such as egg albumen, and gellable binders, such as sodium alginate, are suitable for use in forming the edible protein products of this invention.

The following examples illustrate the process for denaturing the heat-coagulable protein and preparing a meat analog according to this invention but do not limit the scope of the invention. Parts and percentages are by weight unless otherwise specified.

EXAMPLE 1

Pretreatment of Aqueous Protein Solution with Alcohol

Equivalent amounts of sodium caseinate (425 g) and egg white (425 g) are mixed and solubilized in 1000 ml of water. 190 Proof ethyl alcohol (1000 ml) is added to the casein/egg white/water solution to denature the protein. The resulting mixture containing the denatured protein is spread on a tray and air dried at room temperature (23° C.). The dried sheet of denatured protein is ground in a mill, e.g., a Wiley Mill, until it resembles the texture of a coarse meal. The dried, ground, denatured protein is then mixed with cornstarch (150 g) and water (320 g) containing 1.0% sodium bisulfite based on the weight of water. The resulting aqueous protein/cornstarch/sulfite mixture is placed in a mixer (e.g., a Hobart mixer) and thoroughly blended to form a uniform mixture.

The uniform protein/cornstarch/sulfite mixture, having a moisture content of 30%, resembles a flowing powder. This moist, flowing powder is poured into a funnel which feeds a Brabender extruder (manufactured by C. W. Brabender, Hackensack, N.J.) having a 1.8 cm barrel with a 0.6 cm diameter die opening and a length to diameter ratio of 20:1 and a screw compression ratio of 3 to 1. The three consecutive heating zones are set to approximately 100° C., 180° C. and 140° C., respectively. The screw speed is set to approximately 64 revolutions per minute (rpm). The resulting extruded protein product expands as it exits the die opening and is rope-like in appearance. The fibrous extrudate has a white color, essentially no flavor, and has a texture especially suited for further processing to form a meat analog as illustrated in Example 8.

EXAMPLE 2

The procedure of Example 1 for preparing a fibrous extrudate of this invention is repeated, with the exception that a soy protein isolate is used in place of sodium caseinate and a 2.5% sodium sulfite solution is used instead of a 1.0% sodium bisulfite solution. The extrudate protein product has a satisfactory texture, flavor and color for use in a meat analog.

EXAMPLES 3-6

Pretreatment of Aqueous Protein Solution with Heat

The procedure of Example 1 for preparing a product of this invention is repeated, with the exception that various heat treatments are used to denature the protein prior to extrusion and Examples 4-6 involve heat treating a protein, cornstarch and sulfite mixture. Specific conditions are outlined in Table I below.

TABLE I

| | Pre-Extrusion Denaturing of Protein with Heat | | | | | | |
|---|---|---|---|---|---|---|---|
| | Composition of Aqueous Protein Solution | | | | | Heat | |
| Example No. | Egg albumen: | Sodium Caseinate: | Water: (grams) | Cornstarch: | Sodium Bisulfite: | Treatment (°C.) | Time (minutes) |
| 3 | 300 | 300 | 1200 | — | — | 90 | 2 |
| 4 | 300 | 300 | 1200 | 105 | 2 | 80 | 10 |
| 5 | 300 | 300 | 1200 | 105 | 2 | 85 | 5 |
| 6 | 300 | 300 | 1200 | 105 | 2 | 100 | 2 |

After the heat treatment in each of the examples above, the protein solution resembles a coagulated, non-sticky curd. This curd is air-dried as in Example 1 and ground in a mill. The product from Example 3 is mixed with cornstarch (105 g) and sodium bisulfite (2 g) and then blended in a Hobart mixer to form a moist, uniform, flowing powder. The products from Examples 4-6 are independently air-dried, ground in a mill and blended in a Hobart mixter to form a moist, free-flowing powder. The moist, free-flowing powder obtained from each of the Examples 3-6 is independently extruded, as described in Example 1, to form a fibrous extrudate having a white color, essentially no flavor and a texture suitable for preparing a meat analog.

EXAMPLE 7

Pretreatment of Aqueous Protein Solution Mix with Drum Dryer

Following the procedure of Example 1, equivalent amounts of egg white (4.82 Kg) and sodium caseinate (4.82 Kg) are mixed with water (26.5 Kg) in a large Hobart mixer. The resulting mixture is drum dried using a Buflovak Double Drum Dryer with drums of 12" diameter and 18" length. Drum pressures are set at 100 pounds per square inch gauge. Rotation speed is set at 5 units (approximately 65 seconds/rotation). The thoroughly mixed, viscous protein mixture is added to the space above the line of convergence of the drums. Two wooden dams are placed along the edges of the drums to enclose the feed space and help contain the feed material. The resulting material is a mix of sheets and flakes of denatured protein having approximately 18% moisture. The sheets and flakes are ground with a mill to form a free-flowing powder. The powdered, denatured protein is then mixed with 15% amioca starch (solids basis), 0.3% sodium sulfite (solids basis) and water and is further processed as described in Example 1. A fibrous extrudate having a white color and essentially no flavor results.

The above process produces quantities sufficient to feed a 2½" Prodex extruder (manufactured by HPM Corporation, Mt. Gilead, Ohio).

EXAMPLE 8

Preparation of a Shrimp Analog

The white, bland-tasting, fibrous protein extrudate of Example 1 is soaked in water, shredded into finer fiber shapes, mixed with flavorings, color, etc. The resulting mixture containing shredded fibers is shaped in a shrimp-shaped mold and heat set at 100° C. for 10 minutes and produces a shrimp analog having good texture.

We claim:

1. A process for producing texturized protein fibers comprising the steps of:
   (a) preparing a solution of protein material and water having from about 10% to 60% solids, said solids containing from about 30% to about 100% heat-coagulable protein, and 40% to about 90% water by weight;
   (b) denaturing the heat-coagulable protein in the solution formed in step (a), drying and forming a granulated powder of said protein;
   (c) combining a minor amount of starch and a minor amount of an alkali metal sulfite with the protein-containing material of step (a) or (b), said amount of starch effective to control texture of the final product and the amount of alkali metal sulfite effective to control color and flavor of the final product;
   (d) adjusting the moisture level of the protein/starch/sulfite mixture to about 20 to about 40% based on the total weight of the mixture; and
   (e) extruding the moisturized mixture of step (d) in an extruder having a maximum temperature of at least about 140° C. to provide a cohesive extrudate having a fibrous texture.

2. The process of claim 1 wherein the protein material contains a heat-coagulable and a nonheat-coagulable protein material.

3. The process of claim 2 wherein the heat-coagulable protein is selected from the group consisting of egg albumen, blood-serum albumin and milk-whey protein.

4. The process of claim 3 wherein the heat-coagulable protein is egg albumen.

5. The process of claim 2 wherein the protein material comprises egg albumen and sodium caseinate.

6. The process of claim 1 wherein the amount of starch used in step (c) is from 10% to about 30% by weight of the total mixture on a dry basis.

7. The process of claim 6 wherein the starch is selected from the group consisting of corn, amioca, tapioca, wheat, sago and rice.

8. The process of claim 7 wherein the starch is cornstarch.

9. The process of claim 1 wherein the denaturing of step (b) is accomplished by heating the protein solution formed in step (a) to a temperature of from about 80° C. to about 100° C. for from about one minute to about 30 minutes.

10. The process of claim 1 wherein the denaturing of step (b) is accomplished by mixing, at room temperature from 20° C. to about 25° C., the protein solution formed in step (a) with an alcohol selected from the group consisting of methanol, ethanol and propanol.

11. The process of claim 10 wherein the alcohol is ethanol.

12. The process of claim 1 wherein the alkali metal sulfite of step (c) is sodium bisulfite.

13. The process of claim 1 wherein the protein mixture of step (d) is flavored with meat flavorings selected from the group consisting of beef, pork, chicken and seafood.

14. The texturized product prepared by the process of claims 1 or 13.

15. The process according to claim 13 wherein the texturized protein fibers are shaped or molded and thereafter set to form an edible protein product.

16. A shrimp analog prepared according to the process of claim 15.

17. An extrusion process for producing texturized protein fibers containing heat-coagulable protein which comprises the steps of denaturing a sticky, water-soluble heat-coagulable protein selected from the group consisting of egg albumen, blood-serum albumin and milk whey protein to convert said protein to a less sticky, non-cohesive, water-insoluble state, drying and forming a granulated powder of the denatured protein and thereafter extruding in an extruder designed to form natural meat-like fibers.

18. The process of claim 17 wherein the heat-coagulable protein is egg albumen.

19. The process of claim 18 wherein the extruder designed to form natural meat-like fibers is a single-screw extruder.

20. A process for producing texturized protein fibers comprising the steps of:
   (a) preparing a solution containing from about 10% to about 60% egg albumin by weight and about 40% to about 90% water;
   (b) heat treating said solution at a temperature of at least 80° C. for a period of at least two minutes;
   (c) drying and forming a powder from the dried egg albumen-containing material;
   (d) combining a minor amount of starch and a minor amount of an alkali metal sulfite with egg albumen-containing material of step (a), (b) or (c), said amount of starch effective to control texture of the final product and the amount of alkali metal sulfite effective to control color and flavor of the final product;

(e) adjusting the moisture level of the dried egg albumen-containing material from about 20% to about 40% based on the total weight of the material.

(f) extruding the moisturized egg albumen/starch/- sulfite material in an extruder having a maximum temperature of al least 140° C. to provide a cohesive, fibrous extrudate.

21. The process of claim 1 or 6 wherein the amount of alkali metal sulfite used in step (c) is from 0.1 to 2.5% by weight based on the weight of the dry protein mix.

* * * * *